UNITED STATES PATENT OFFICE.

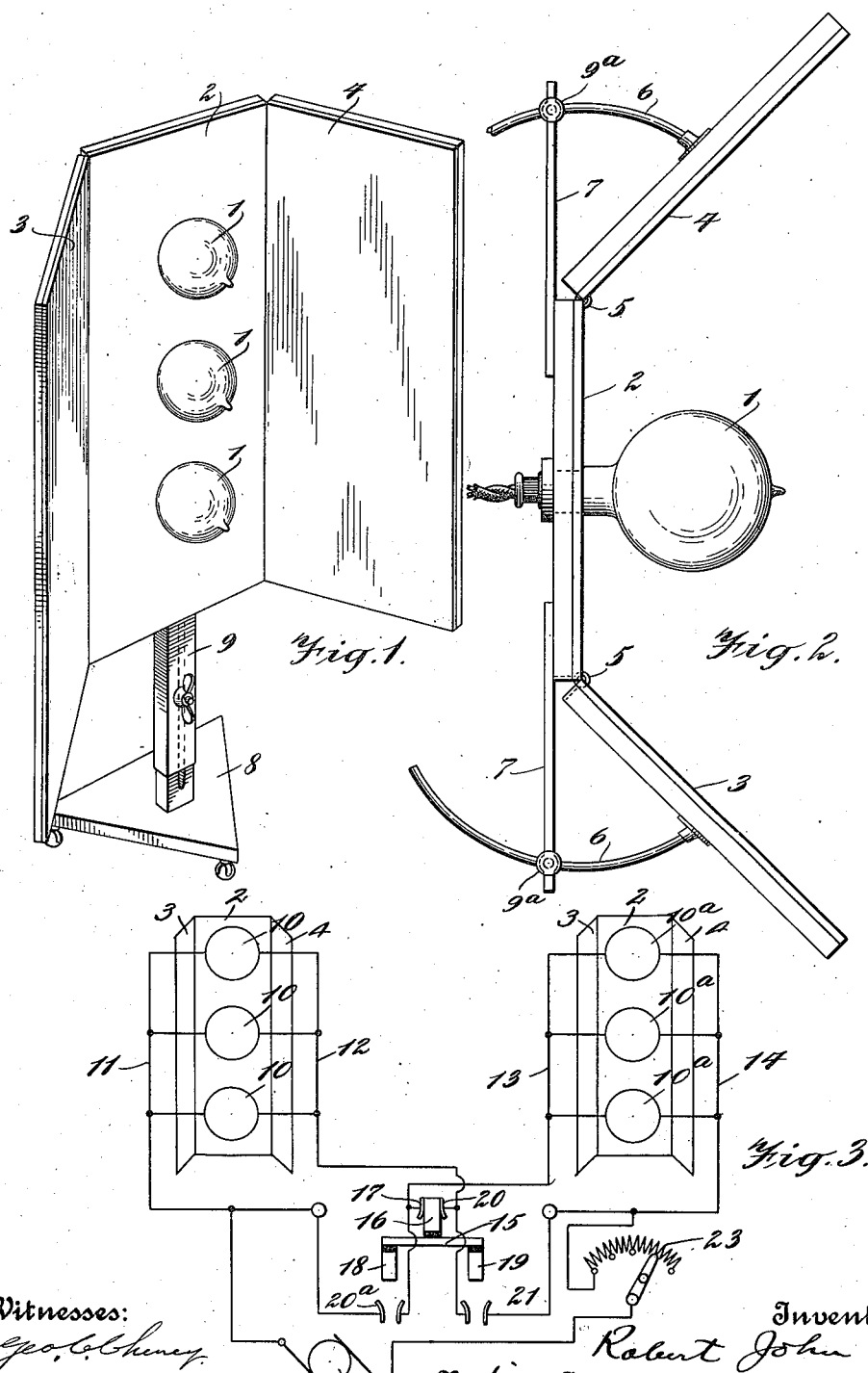

ROBERT JOHN, OF NEW YORK, N. Y., ASSIGNOR, BY MESNE ASSIGNMENTS, TO ICONO-CHROME COMPANY OF AMERICA, INC., A CORPORATION OF NEW YORK.

PHOTOGRAPHIC LIGHTING.

1,216,696.      Specification of Letters Patent.      Patented Feb. 20, 1917.

Application filed April 26, 1915. Serial No. 24,034.

*To all whom it may concern:*

Be it known that I, ROBERT JOHN, a citizen of the United States, residing at the city of New York, in the borough of Manhattan and State of New York, have invented certain new and useful Improvements in Photographic Lighting, of which the following is a full, clear, and exact description.

The primary object of the invention is to produce a light for illuminating an object during an ordinary or a color photographic process by means of which a picture may be obtained either in varying gradations of black and white, corresponding to the visual luminosity of the color tones of the object when viewed in normal sunlight, or in colors which are indistinguishable in shades and hues from the colors of the object when both are viewed under the same conditions,—that is, a light which is actinically correct for a photographic plate or film of a determined sensitiveness.

Another object of the invention is to produce a light for photographic purposes which may be temporarily adjusted to render it actinically correct for different makes of photographic plates or films which are more or less sensitive to different of the actinic rays forming the components of the light.

A further object of the invention is to provide means for directing and controlling the rays from an illuminant whereby any desired effects of light and shadow may be obtained, and whereby the transmitted and reflected rays from the illuminant will combine and blend upon the object to be photographed to produce an actinically correct light.

A still further object of the invention is to provide means whereby a subdued light may be obtained during the posing and focusing period and whereby the intensity of the illuminant may be greatly increased when the exposure to the light-sensitive medium occurs.

According to the well known theories, the color of an object is due to the power which it has to absorb some of the color rays of the spectrum and to reflect others, the reflected rays alone affecting the eye and giving the sensation of color. In photographic processes, the same theory applies, for it is the color rays, or more properly the actinic rays, reflected from the object, that act upon the light-sensitive medium to cause the chemical reaction which takes place upon the exposure of the plate. But different actinic or color rays differ in their effect upon the eye and their action upon a light-sensitive medium. The visual luminosity curve of the spectrum shows that, in sunlight, yellow and green are the most brilliant, while red and blue are less luminous. On the other hand, a curve showing the sensitiveness of the newer forms of sensitive plates for black and white work, which are slightly panchromatic, shows that the blue, violet and ultra-violet rays have a powerful chemical action upon such plates, the green rays a much weaker action and the red rays only a slight action. With some makes of plates which are not even slightly panchromatic, the red rays will not affect the sensitized medium at all. While the range of sensitiveness of the "Lumière autochrome" and other plates used in color processes is increased by making the plates more nearly panchromatic, yet the various actinic rays have a similar action upon these plates, the blue rays being by far the most powerful. All of these effects are observed when sunlight is employed as the illuminant, and when the object to be photographed is lighted by any of the known forms of artificial illuminants the difference between the visual luminosity of the color rays and their actinic effect upon a light-sensitive medium is even more pronounced.

In the production of artificial illuminants, in the past, the aim has been to reproduce as nearly as possible the characteristics of sunlight. My invention, however, is a departure from previous efforts in that it is designed for the production of a light which overcomes defects in, and is consequently an improvement upon, sunlight for photographic purposes. The invention contemplates providing a light for illuminating a colored object for all kinds of photographic processes, in which the different kinds of actinic rays are present in amounts sufficient to cause each of them to have an equally strong action upon a sensitized plate of a determined sensitiveness. In order that this may be more fully understood, assume that a given make or kind of a panchromatic photographic plate for black and white photography is sensitive to the primary actinic rays of sunlight in substantially the following ratio: blue 1, green $\frac{1}{5}$, and red $\frac{1}{8}$, which are approximately the values they have in a standard sensitive plate. Assume also that it is desired to simultaneously photograph upon the plate three squares colored blue, green and red, respectively. If the plate is exposed and a black and white positive made, it would show the three squares in varying gradations of black. The one representing the red square would be almost black, the one for the green square would be a grayish black, while the one for the blue square would be a decided light gray. If the same three squares were photographed upon a color screen plate such as a "Lumière autochrome," the blue would be much more brilliant than the green and red, although the latter are the most brilliant when the squares themselves are viewed in sunlight. To overcome this defect in color plates and also in black and white prints, a color filter has been employed. When such filter is used, however, the reflected rays from the object, before striking the sensitized plate, pass through the filter, and the latter absorbs a large part of the blue rays and also a portion of the green rays, permitting the red rays to pass almost unobstructedly through it. The different kinds of color rays will then have almost an equal chemical action on the plate. In order to obtain this result, only a relatively small amount of the light which is reflected from the object and would be normally transmitted to the plate, reaches it and chemically reacts with it. As a consequence, the time of exposure is increased proportionately and for the greater volume of photographic work the process is impractical.

By my invention, I preferably produce this actinically correct light, not by cutting down the quantity of the actinic rays which have a strong action upon the light sensitive medium, but by permitting the quantity of the more powerful active actinic rays, which would normally be transmitted to the plate, to remain the same, and increasing the quantity of the actinic rays which have a weak action on the medium. By so doing, the time of exposure is not increased, due to the fact that the excessive quantities of the different actinic rays, which have a weak action on the light sensitive medium, have a chemical action on a plate or film equally as strong as the actinic rays which have a greater chemical affinity for the plate, but which are present in considerably less quantities.

In accomplishing the foregoing, I employ a colored reflector, adapted for use with either natural or artificial illuminants, which will absorb the rays having a strong action on the film or plate and reflect the rays having a weak action thereon. The reflector is arranged so that the transmitted rays from the illuminant which would normally strike the object are permitted to do so while added to these rays are those reflected from a portion of the light from the illuminant which would not be transmitted to the object. The different actinic rays forming the component parts of the reflected light are, however, only those rays which have a weak action upon the plate, or film. The reflecting surface of the reflector is so designed that the quantity of the different actinic rays present in the combined light is substantially inversely proportional to the degree of sensitiveness of the light-sensitive medium to the respective rays. That is to say, with a plate which is sensitive to the blue, green and red rays of sunlight in the ratio of 1, $\frac{1}{5}$ and $\frac{1}{8}$, the surface of the reflector is designed so that it will absorb all of the blue rays. This can be accomplished by using a yellow, preferably dull, reflecting surface. A small quantity of the green rays should also be absorbed and the red rays should all be reflected. The green rays can be absorbed by adding to the yellow color of the reflecting surface a small quantity of red. The combined transmitted and reflected light blended upon the object will therefore be composed of the blue rays from the transmitted light and a great excess of red and green rays from the reflected and transmitted light. To be theoretically correct, the reflector should be designed so that the quantity of reflected light will be approximately seven times that of the transmitted light, in which case the combined reflected and transmitted light will be composed of about eight times as much red rays as blue, i. e. all the red rays in both the reflected and transmitted light, and five times as much green rays as blue, since some of the green rays have been absorbed. When the sensitized medium is exposed in a light which is thus made actinically correct, the colored surfaces of the object will reflect and transmit through the lens of the camera, the different rays in the amounts stated, and the exposure of the plate or film will require no longer time than if direct sunlight were used, since all of the blue rays of the transmitted light which are reflected from the object chemically affect the sensitive plate and the action of the other kinds of rays occurs in practically the same period of time due to the excessive amounts of these rays which are present. In designing a color reflector for the illuminant it may be difficult to follow exactly the theoretical principles involved. Especially may it be difficult to provide a reflector which will reflect an amount of light having an exact, definite ratio to the amount of transmitted light which strikes the object. But good results may be obtained, practically, if the reflector be such that the quantity of reflected light is greatly in excess of the transmitted light from the illuminant. And while the quantity of reflected light should approach as closely as possible the exact quantity necessary to obtain perfect results, my invention includes the constructions referred to with which good results are obtained and the term "substantially inversely proportional" in the claims is intended to cover such constructions as well as those which are specifically comprehended by said term.

In practice, it is desirable to use an artificial illuminant, such as an electric incandescent lamp, as the source of light, and lamps of the "nitrogen" type, owing to their intense brilliancy, are admirably suited for the purpose. The light from electric arc lamps, and that produced by burning magnesium or other flash powders may also be used, since a reflector having a suitable reflecting surface of an appropriate color may be readily determined when the light is analyzed with a spectroscope and the range of sensitiveness of the given photographic plate or film which is to be used with it is known. The color which the reflector should have is readily calculated, and one specific method of calculation will be hereinafter given.

Provision may be made for temporarily adjusting a source of light, actinically correct for a photographic plate of a certain determined sensitiveness, so that the same may be used with photographic plates of different ranges of sensitiveness. It is well known that the activities of the different actinic rays of sunlight differ with varying intensities of the sunlight. This is in accordance with the recognized theory of color sensation, that the visual luminosity of the red portion of the spectrum increases with an increase in intensity of sunlight. Thus, in a dull light, the blue end of the spectrum is the more luminous, but as the sun-light becomes more intense the line indicating the more luminous portion of the spectrum moves toward the red end thereof. The same theory applies to the intermediate colors of the spectrum. That is, the colors adjacent the red portion of the spectrum have their greatest visual luminosity in bright sun-light and are less brilliant in a more subdued light, and so on down to blue. Now, if a color reflector designed according to my invention, for a given make of photographic plate, is found not to properly correct the light for another make of photographic plate with which it is desired to be used, that is, if the latter plate, for example, is more sensitive to blue rays than the plate for which the reflector producing the corrected light was originally designed, then the exposure of the plate should be made in the brightest sun-light possible in order to obtain the best results. However, the utilization of this principle is more important when an artificial illuminant is used, since the intensity of an artificial illuminant may be readily regulated to any desired degree. But while the principle involved is the same, most artificial illuminants follow a different rule. For example, if the brilliancy of an electric incandescent lamp is increased, the line or zone of greatest luminosity moves toward the blue end of the spectrum rather than toward the red, as in the case of sun-light, and if the brilliancy or intensity of the light of such a lamp be decreased the line of greatest luminosity moves toward the red end of the spectrum. Assume, now, that one of my color reflectors, associated with a certain artificial illuminant, is so designed as to produce an actinically correct light for a given make of photographic plate, and it is desired to use such illuminant and reflector with a slightly different make of photographic plate whose range of sensitiveness varies somewhat from the one for which the reflector was designed, as for example, with a plate which is more sensitive to the blue rays than the plate for which the color reflector was originally designed. To obtain the best results, the voltage of the lamps should be decreased to decrease the intensity of the light produced. This will render the red actinic rays more active and the blue rays less active. The intermediate actinic rays are similarly affected, so that if a plate is less sensitive or more sensitive to any given actinic ray than the plate for which the corrected light was produced, the variation in sensitiveness may be readily compensated for by regulating the intensity of the illuminant. When electric incandescent lamps are used, their intensity may be readily controlled by means of rheostats inserted in the circuit to the lamps. The intensity of the illuminant may not, of course, be varied to a great extent, for in reducing the intensity of the lamps the time necessary for the exposure of the plate is increased, and if a large number of plates of different makes are to be exposed, it is better to design a suitable color reflector for each type of plate.

In carrying out the principles of my invention where both transmitted and reflected light are utilized in producing an actinically correct light, it is essential that both the transmitted and reflected rays focus and blend upon the object to be lighted during the photographic process. To accomplish this the color reflector is preferably made with angularly adjustable wings so that it may be arranged at any desired angle to the object and the area of illumination increased or diminished at will. By this means, infinite variations in the effect of light and shade may be produced and yet the blending of the reflected and transmitted light obtained. When the adjustable wings form wide obtuse angles to the stationary part of the reflector, the surface of the wings should be curved in order to direct the reflected light which strikes the surfaces of the wings inwardly, that is, in a direction to focus upon the object to be photographed. A parabolic reflector might be used, but one of this type would not permit wide variations in the area of illumination although the blending of the reflected and transmitted light might be more perfect.

When an artificial light which is sufficiently intense for photographic purposes is used, its brilliancy is so great that it cannot be endured by the human eye for long periods of time and it will also generate sufficient heat to cause an object relatively close to it to be heated excessively. If an artificial illuminant employed in making photographs of human beings is permitted to remain in its most luminous condition during the periods of posing and focusing it will produce watery eyes, strained expressions, and in many ways annoy the sitter to such an extent that the perfection of the picture is impaired. Furthermore, in photographic perishable objects, such as flowers, the heat generated from the illuminant during posing is frequently sufficient to cause such objects to fade or wilt. And in other respects, the light and heat of the illuminant during posing and focusing are objectionable. To overcome these objections, I utilize an illuminant, the brilliancy of which may be controlled, and reduce the intensity of the same during the posing and focusing operations. Afterward, when the time for exposure approaches, the intensity of the illuminant is increased until it reaches its necessary full brilliancy, which is maintained only for the short period of time necessary for the exposure. When incandescent lamps are used as the iluminant, a plurality of the same may be connected up in series and parallel. In such case it has been found that the reduction in the voltage upon the lamps, due to switching them from parallel to series, is sufficient to reduce the brilliancy and heat of the illuminant the necessary amount.

In the accompanying drawing, I have shown, somewhat diagrammatically, one form of apparatus for producing a corrected actinic light in accordance with my invention.

Figure 1 is a perspective of a reflector with a series of artificial lights thereon;

Fig. 2 is a transverse section of the same, and

Fig. 3 is a diagram of the electrical connections used.

In the apparatus shown, the illuminant or source of light comprises a plurality of nitrogen incandescent lamps 1, which, on account of their high brilliancy, are especially adapted for photographic work. These are mounted upon a reflector comprising a back piece 2 and adjustable wings 3 and 4, respectively. The wings 3 and 4 are hinged to the back piece, as at 5, and are capable of swinging angularly thereto. Rods 6 passing through suitable openings in the ends of brackets 7 carried by the rear face of the stationary part of the reflector and engaged by thumb screws 9ª carried by the brackets hold the wings in the desired adjusted position. The reflector is shown mounted upon a movable stand 8 by means of an adjustable standard 9, so that the height of the same may be varied at will. In practice two or more reflectors are used so that light may be directed at different angles upon the object to be photographed. In this way the deep shadows which would otherwise occur are eliminated. With each reflector a plurality of nitrogen lamps 1 are preferably used, three being shown, but a greater or less number may be used, as desired.

A test of a nitrogen lamp with a spectroscope and a comparison of the same with the sensitive curve of a given make of panchromatic plate shows that the rays emanating from the lamp contain an excess of blue rays. These rays have the strongest action upon the sensitive plate. The light from the lamp also contains an excess of red rays which more than compensates for the weaker action of these rays in comparison with the slightly stronger action of the green rays. The surface of the reflector is preferably dull, consisting of blotting paper or like material, and is colored with a yellow dye to absorb the blue rays, and with a green dye to absorb some of the red rays, the resulting yellow-green color reflecting all of the green rays produced by the lamp. The wings 3 and 4 of the reflector are of such width that the quantity of reflected light which strikes the object to be photographed is greatly in excess of the amount of transmitted light so that the relative amounts of actinic rays in the reflected and transmitted light which blend upon the object, are substantially inversely proportional to the respective strengths of the action of these rays upon a given panchromatic plate. When the exposure is made each of the colors reflected from the object will be transmitted through the lens to the sensitive plate in amounts sufficient to cause the red and green rays to have equally as strong an action upon the sensitive plate as the blue rays have, and in the same period of time.

Referring now to Fig. 3, I have shown electrical connections suitable for two different sources of illumination, the lamps 10 forming one source and the lamps 10ª the other. Associated with each set of lamps is a suitable reflector. The lamps 10 of one set are connected in parallel through the wires 11 and 12, and the lamps 10ª of the other set through the wires 13 and 14. These wires lead to a series-parallel foot switch 15, which is so constructed that when one blade 16 thereof is in contact with the terminals 17 the two sets of lamps 10, 10ª are connected in the series with each other, and when the blades 18 and 19 are closed upon their associated contacts 20 and 21, respectively, the two sets of lamps are connected in parallel. The wires 11 and 14 are connected to a source of current, such as a dynamo 22, and a rheostat 23 is included in the circuit so that the voltage of the entire system may be changed and the brilliancy of the lamps varied, when it is desired to temporarily adjust the quality of the actinic light slightly to correspond to a given type or make of photographic plate. The apparatus shown is intended to be merely illustrative of one means for carrying out the invention and I do not desire to be limited to any of the details of construction therein except as defined in the claims.

I claim:

1. An apparatus for producing a light for illuminating objects during a photographic process, comprising an illuminant having rays present in determinable amounts and of different actinic activities, a portion of the transmitted light from said illuminant striking the object to be photographed, and means for reflecting from said illuminant selected rays and for projecting them upon the object to be photographed so that they combine with the rays of transmitted light, said reflected light consisting only of such rays from the illuminant as will cause the different rays in the combined transmitted and reflected light to be present in amounts substantially inversely proportional to their respective actinic activities.

2. An apparatus for producing a light for illuminating objects during photographic processes, comprising an illuminant composed of different color rays present in determinable amounts and having different actinic activities, a portion of the light transmitted from said illuminant striking the object to be photographed, and a reflector associated with said illuminant for reflecting selected color rays from said illuminant upon the object to be photographed, said reflector having a colored surface which absorbs such of the color rays from the illuminant as will cause the different color rays in the combined transmitted and reflected light to be present in amounts substantially inversely proportional to their respective actinic activities.

3. An apparatus for producing a light for illuminating objects for photographic processes, comprising an illuminant, having a portion of the transmitted light composed of blue, red and green rays striking the object to be photographed, and means for absorbing the blue rays and for reflecting upon the object a part of the green rays and all of the red rays from another portion of the light from said illuminant.

4. An apparatus for producing a light for illuminating objects during photographic processes, comprising a nitrogen lamp, as a source of illumination, and a color reflector therefor having a surface of a color in which yellow and red predominate, yellow being present in a marked excess to that of red.

5. An apparatus for producing a light for illuminating objects during photographic processes, comprising an illuminant, means for varying the intensity thereof, and a color reflector associated with said illuminant, said reflector having a reflecting surface capable of absorbing the actinic rays from the illuminant which have a strong action upon a light-sensitive medium and of reflecting the actinic rays which have a weak action upon such medium.

6. An apparatus for producing a light for illuminating objects during photographic processes, comprising an incandescent electric lamp, as a source of illumination, means for varying the voltage of the electric current through the lamp, and a color reflector associated with said lamp having a reflecting surface capable of absorbing those actinic rays which have a strong action upon a light-sensitive medium and of reflecting those rays which have a weak action thereon.

7. An apparatus for producing a light for illuminating objects during photographic processes, comprising an electric incandescent lamp of the nitrogen type, as a source of illumination, a color reflector associated therewith having a reflecting surface of a color in which yellow and red predominate, and means for varying the intensity of the light produced by said lamp.

8. An apparatus for producing a light for illuminating objects during photographic processes, comprising an electric incandescent lamp of the nitrogen type, as a source of illumination, a color reflector associated therewith having a reflecting surface of a color in which yellow and red predominate, and means for varying the voltage of the electric current passing through said lamp.

9. An apparatus for producing a light for illuminating objects during photographic processes, comprising an illuminant, and a reflector associated therewith having a reflecting surface capable of absorbing such actinic rays as have a strong action upon a light-sensitive medium and of reflecting the actinic rays which have a weak action upon such medium, said reflector having adjustable wings for varying the area of illumination.

10. An apparatus for producing a light for illuminating objects during photographic processes, comprising an illuminant, and a reflector therefor having adjustable wings, said reflector and wings having reflecting surfaces capable of absorbing such actinic rays as have a strong action upon a light-sensitive medium and of reflecting the actinic rays which have a weak action thereon.

11. An apparatus for producing a light for illuminating objects during photographic processes, comprising a pair of electric incandescent lamps disposed at a distance from each other and forming two sources of illumination, a color reflector for each lamp capable of absorbing such actinic rays from said lamp as have a strong action upon a light-sensitive medium and of reflecting such rays as have a weak action upon such medium, and means operable at will for connecting said lamps in series or parallel.

12. An apparatus for producing an actinically correct light for illuminating objects during photographic processes, comprising means for directing different actinic rays of light against the object to be photographed in amounts substantially inversely proportional to their respective actinic activities.

13. In an apparatus for producing an actinically correct light for illuminating objects during photographic processes, an artificial illuminant having a portion of the transmitted light therefrom striking the object to be photographed, and a reflector having a colored surface reflecting upon the object and causing to blend with the rays of the transmitted light only such rays from another portion of said illuminant as will cause the different actinic rays in the blended light to be present in amounts substantially inversely proportional to their respective actinic activities.

In witness whereof, I subscribe my signature, in the presence of two witnesses.

ROBERT JOHN.

Witnesses:
   WALDO M. CHAPIN,
   JULE ZELENKO.